United States Patent [19]

Nelson et al.

[11] Patent Number: 5,119,231
[45] Date of Patent: Jun. 2, 1992

[54] HYBRID DIFFRACTIVE OPTICAL FILTER

[75] Inventors: Scott A. Nelson, Coon Rapids; J. Allen Cox, New Brighton; Gordon V. Jorgenson, Minneapolis, all of Minn.

[73] Assignee: Honeywell Inc., Minneapolis, Minn.

[21] Appl. No.: 538,963

[22] Filed: Jun. 15, 1990

[51] Int. Cl.$^5$ ............................. G02B 5/18; G02B 5/28
[52] U.S. Cl. ..................................... 359/359; 359/576; 359/589
[58] Field of Search ................. 350/162.2, 162.23, 164, 350/166, 1.6, 1.7; 359/359, 576, 589

[56] References Cited

U.S. PATENT DOCUMENTS

| | | | |
|---|---|---|---|
| 4,009,939 | 3/1977 | Okano | 350/166 |
| 4,114,978 | 9/1978 | Bostick et al. | 350/162.23 |
| 4,313,648 | 2/1982 | Yano et al. | 350/166 |
| 4,322,125 | 3/1982 | Warren | 350/164 |
| 4,534,620 | 8/1985 | Gale et al. | 350/166 |
| 4,915,463 | 4/1990 | Barbee, Jr. | 350/162.23 |
| 4,983,002 | 1/1991 | Shikama et al. | 350/162.2 |

Primary Examiner—Bruce Y. Arnold
Assistant Examiner—Martin Lerner
Attorney, Agent, or Firm—John G. Shudy, Jr.

[57] ABSTRACT

A hybrid filter having an inherently planar interference stack adhered to a nonplanar diffractive grating. The filter can have a planarization layer between the stack and grating. The hybrid filter has a spectral light transmittance value that is at least equal to or greater than the transmittance value of the least transmissive filter component. The filter also has a spectral bandwidth that is narrower than the spectral bandwidth of either filter component.

7 Claims, 3 Drawing Sheets

HYBRID DIFFRACTIVE OPTICAL FILTER

FIELD OF THE INVENTION

The invention pertains to diffractive devices and particularly to diffractive/interference filters.

BACKGROUND OF THE INVENTION

Diffractive devices and interference filters, which are well-known in the art, have certain useful characteristics when standing alone. No successful means has been achieved to date for combining these characteristics into a device that replicates the characteristics and results in performance that is greater than the performance of the diffractive device or the interference filter.

SUMMARY OF THE INVENTION

The present invention is a hybrid combining of a planar interference stack with a nonplanar diffractive grating. This hybrid optical filter may or may not include a planarization layer between the diffractive grating and the interference stack. The achievement of either combination has resulted in a filter that has a transmission quality which exceeds that of the least transmissive element of the invention. Also, the spectral bandwidth of the filter is narrower than the spectral bandwidth of either element.

DESCRIPTION OF THE PREFERRED EMBODIMENTS

Figure 1:
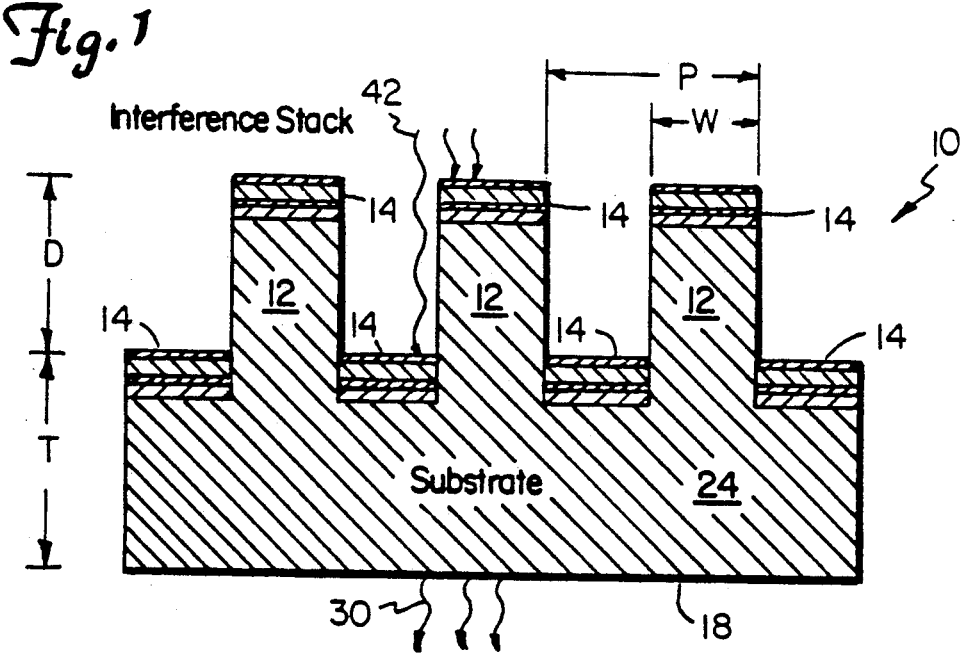
FIG. 1 reveals a hybrid diffractive/interference optical device.
Figure 2:
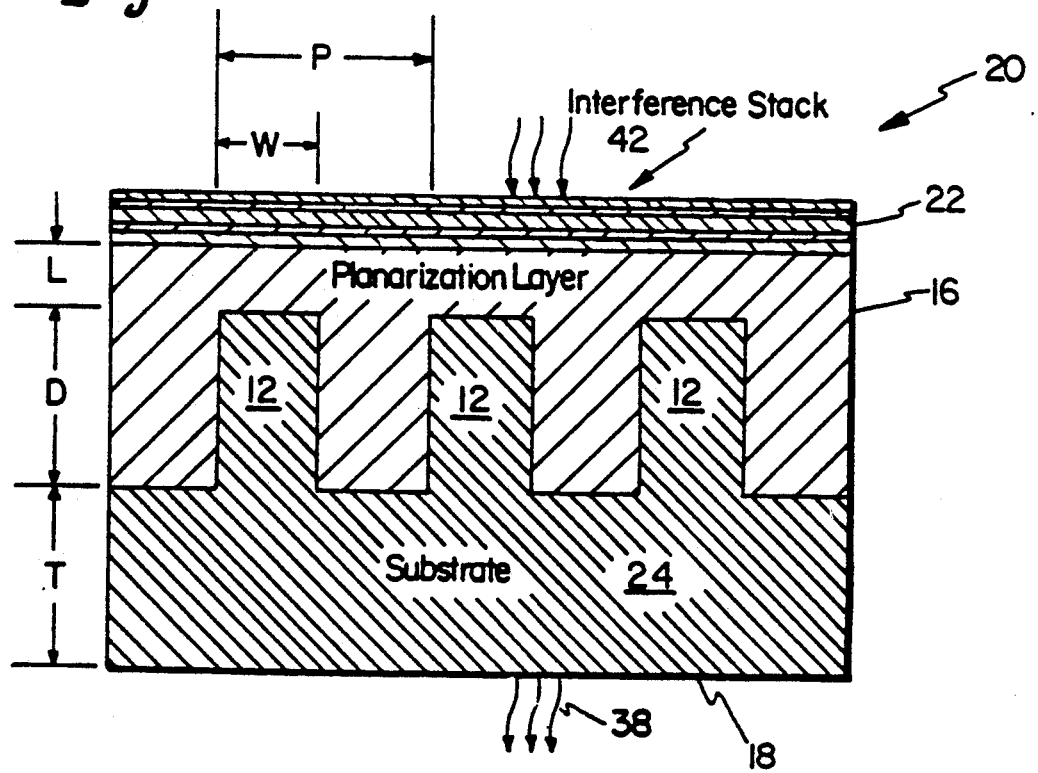
FIG. 2 reveals a hybrid diffractive/interference optical device having a planarization layer between the diffractive grating and the interference stack.

In general, the broad pass band of a diffractive grating infrared (IR) filter is narrowed by over-coating the grating with a specifically designed multilayer interference filter. In fact, the spectral bandwidth of the invention is narrower than the spectral bandwidth of either the grating or the dielectric stack, and the transmittance within the filter passband is higher than the transmittance of the grating, thus resulting in an optimum device. Two embodiments of the invention have been implemented. The first is a hybrid structure 10 that has a simple coating on a grating 12 of an interference stack 14 as shown in FIG. 1. The second, in FIG. 2, is a structure 20 that utilizes a process to planarize grating 12 with a specially designed coating 16 prior to over-coating with a coincidentally designed interference stack 22.

The hybrid structure of FIG. 1, implementing the invention consists of a linear grating 12 designed to give broadband transmittance at 4.0 micrometers which is then over-coated with an 8 layer interference stack 14 designed to enhance the spectral response of grating 12 by narrowing the pass band. Grating 12 is designed with a period of 8 micrometers, a duty cycle of 30 percent (dictating a width W of 2.4 micrometers) and a depth D of 1.65 micrometers. Although the shape of grating 12 peaks and wells of FIG. 1 are rectangular in shape, they can be of any other shape——round, triangular, step-like, etc.——and even though gratings 12 here are linear, they can be curved or have any other configuration. For example, the gratings may be in the form of circular lenslets localized to a pixel format, such as for detector arrays.

Grating 12 is of a silicon substrate 24 having an index of refraction of 3.6 and a thickness T of about 15 mils. Substrate 24 is of semiconductor quality but can be of a polished quality for improved performance. Substrate surface 18 opposite of grating 12 is coated with an antireflective (AR) material. Other substances may be used for substrate 24, grating 12 and interference stack 14. These substances may be opaque to the visible and other spectrums. Interference or enhancement stack 14, made of alternating germanium (Ge) and zinc selenide (ZnSe) layers having indices of refraction of 4.0 and 2.44, respectively, is designed for a particular band pass frequency by modeling grating 12 transmittance together with 8 layer stack 14. Interference or enhancement stack 14, which goes on top of grating 12, including the wells, is designed to reduce the pass band by a factor of 2. In embodiment 10, the layers' substances and optical and physical thicknesses in micrometers, respectively, of stack 14 of the interference filter on silicon grating 12, beginning with the nearest layer to the grating, are: Ge, 0.5461, 0.5042; ZnSe, 0.2790, 0.4224; Ge, 0.2829, 0.2612; ZnSe, 0.3097, 0.4689; Ge, 0.0536, 0.0495; ZnSe, 0.1115, 0.1688; Ge, 0.3330, 0.3074; and ZnSe, 0.2687, 0.4068. The physical thickness is equal to the optical thickness multiplied by the nominal wavelength (i.e., 3.69388 micrometers) divided by the index of refraction of the material.

Figure 3:
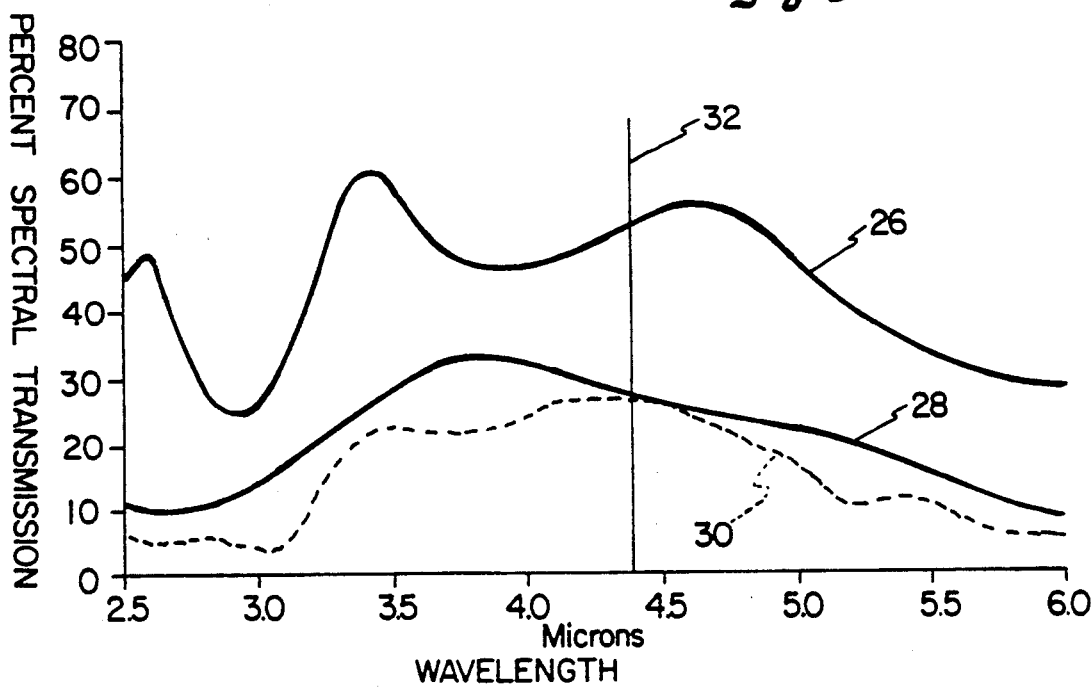
FIG. 3 shows measured performance results of the device without the planarization layer.

FIG. 3, in terms of percent of spectral transmission versus wavelength, shows measured pass band characteristics of fabricated structure 10 of FIG. 1 for light 42 entering filter 10. Curve 26 represents the percent of spectral transmission of light at a given frequency through interference stack 14. Curve 28 is the percent of light transmission for grating 12 and substrate 24. Curve 30 is the percent of spectral transmission of light 30 coming through combination filter 10. Ordinarily, the spectral transmission of filter 10 at 4.4 microns, as indicated by line 32, would be the percent of transmission (i.e., 52 percent) for interface stack 14 multiplied by the percent of transmission (i.e., 25 percent) for grating 12 and substrate 24, which is equal to 13 percent. In actuality, filter 10 has transmission factor of 25 percent, nearly 100 percent greater than the expected factor.

Figure 5:
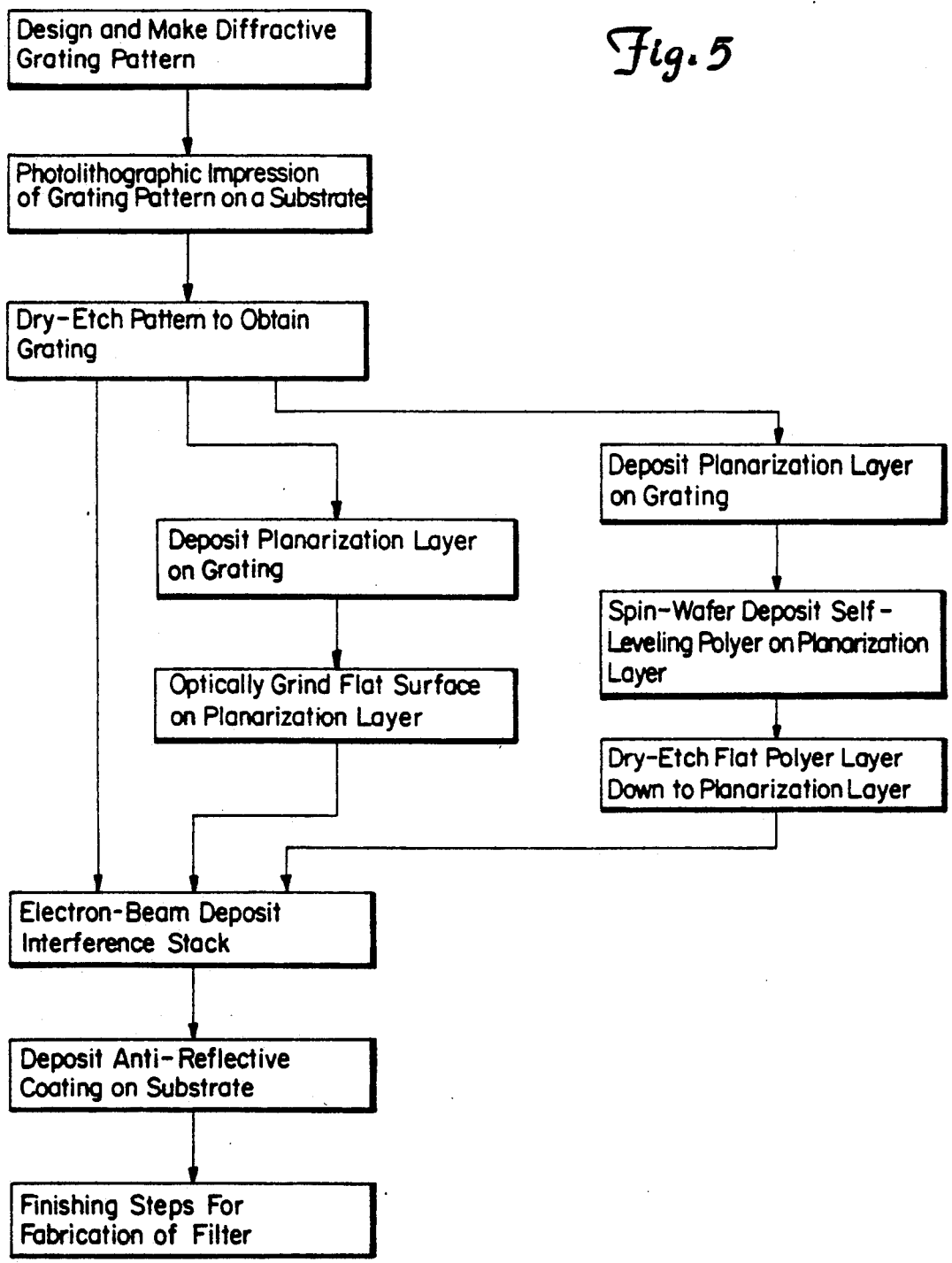
FIG. 5 is a flow diagram showing fabrication steps of the device.

A method, as shown in FIG. 5, of producing filter 10 includes designing diffractive grating 12 and developing a pattern that is to be put on silicon substrate 24 with photolithography. Then the pattern is dry-etched resulting in diffractive grating 12. Next, alternating layers Ge and ZnSe for stack 14 are put on grating 12 with electron beam deposition. Additionally, an anti-reflective pattern is put on a surface of the silicon substrate opposite, of the grating surface.

Since an interference filter is inherently a planar structure, a hybrid combination 20 was made which comprises putting on a non-planarized grating 12 a planarized layer 16 coated with interference stack 22. Filter 20 is the best mode of the invention as it provides better performance than filter 10 as indicated by a comparison of FIGS. 3 and 4. The planarization process consists of a deposition of a relatively thick silicon nitride ($Si_3N_4$) layer 16, having an index of refraction of 1.9, followed by an over-coating of a self-leveling polymer. Adding layer 16 changes the band pass frequency of hybrid filter 20. Silicon nitride 16, to some extent, follows the contours of grating 12 that it is applied to. The polymer, which is applied on silicon nitride layer 16, has an etch rate equal to that of the nitride. When the polymer is etched away, the smooth planar surface of the polymer is transferred to silicon nitride 16 and grating 12 is thus planarized with silicon nitride 16. Rather than using the polymer, the external surface of silicon nitride 16 may be optically polished flat. Grating 12 should be planarized with the thinnest possible planarization layer 16 at dimension L, in order to maintain phase coherence between grating 12 and substrate 24 and stack 22. Stack 22 is designed to enhance planarized structure 16. For phase coherence, the light waves need to be in phase when they reach the well bottom level of grating 12, whether travelling through silicon 12 and or silicon nitride 16. Thickness L of planarization material 16 is set at a multiple of quarter wavelengths of the pass band of filter 20.

Grating 16 is planarized to within about 0.5 micrometers. Thickness L of planarization layer 16 between stack 22 and the tops of grating 12, is about 1.35 micrometers. Grating 12 is approximately 1.65 micrometers deep. Even though planar structure 16 is not ideal and the tops of silicon grating 12 lines may be exposed due to the strong radial dependence of the planarization etch, device 20 achieves significant pass band improvement. The structure and dimensions of grating 12 are the same as those of grating 12 of filter 10 without planarization layer 16, as described above. Also, like the grating of filter 10, grating 12 of filter 20 can take the form of various shapes and gratings. Further, different substances may be used for filter 20. In embodiment 20, having silicon nitride planarization layer 16, the layer substances and optical and physical thicknesses in micrometers, respectively, of stack 22 of the interference filter on silicon grating 12, beginning with the nearest layer to the grating, are: Ge, 0.6353, 0.2971; ZnSe, 0.4767, 0.3655; Ge, 0.2030, 0.0949; ZnSe, 0.1704, 0.1306; Ge, 0.1444, 0.0675; ZnSe, 0.0633, 0.0485; Ge, 0.2211, 0.1034; and ZnSe, 0.2918, 0.2237. The nominal wavelength is 1.8707 micrometers for planarized filter 20.

A method, as shown in FIG. 5, of producing planarized filter 20 begins with designing a diffractive grating and developing a pattern that is to be impressed on silicon substrate 24 with photolithography. Then the pattern is dry-etched resulting in a diffractive grating 12. Then silicon nitride 16 is put on grating 12 with chemical vapor deposition. On silicon nitride 16, a self-leveling polymer is spin deposited to get a flat surface on the polymer. The polymer is dry-etched down to silicon nitride 16. Since the etch rates of the polymer and silicon nitride 16 are the same, the flat surface of the polymer is etched right on to silicon nitride 16 down to design thickness L for planarization layer 16. Another method for obtaining a flat surface and design thickness L for planarization layer 16 is optical polishing of layer 16. After completion of planarization layer 16, then alternating layers of Ge and ZnSe are put on planarization layer 16 with electron-beam deposition. Additionally, an anti-reflective is deposited on a surface of the silicon substrate, opposite of the planarization surface.

Figure 4:
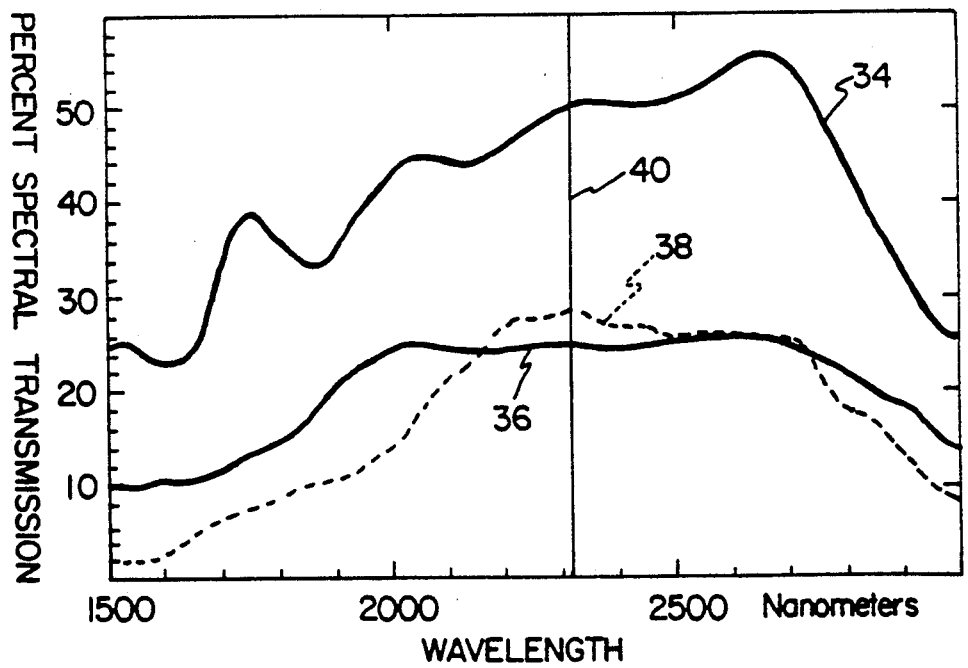
FIG. 4 shows measured performance results of the device with the planarization layer.

FIG. 4 shows measured band pass characteristics of filter 20 in FIG. 2 for light 42 entering filter 20. Curve 34 represents the percent of spectral transmission of light at a given frequency through interference stack 22.

Curve 36 is the percent of light transmission for grating 12 and substrate 24. Curve 38 is the percent of spectral transmission of light 38 coming through combination filter 20. Ordinarily, the spectral transmission of filter 20 at 2.32 micrometers or 2320 nanometers, as indicated by line 40, would be the percent of transmission (i.e., 50 percent) for interference stack 22 multiplied by the percent of transmission (i.e., 25 percent) for grating 12 and substrate 24, which is equal to 12.5 percent. In actuality, filter 20 has a transmission factor of 28 percent, 124 percent greater than the expected factor. The overall transmission values of measured filter 20 are not optimal due to scattering by the surface roughness in the fabrication. This roughness is the result of the non-optimized etch rates and parameters in the planarization etch.

Transmission characteristics can be increased if improved planarization techniques and higher quality fabrication are used. Filter 20 is fabricated using the etch-back method. A method that may better achieve optically flatter planarization, is the depositing of a planarizing coating onto the grating and the optically polishing down the coating to the proper thickness. In essence, the invention indicates that a very narrow band (i.e., 200 nanometer) infrared (IR) filter needs only a 15 layer interference stack. If such a filter were constructed from only interference stacks, then the same filter would require over 30 layers. In summary, points on the transmission curves of FIGS. 3 and 4 indicate that light transmission of hybrid structure 10 or 20 is much higher than a point-by-point combining or product of transmittance values of individual diffractive and interference filters at those respective points. The invention of combining planar technology with nonplanar technology results in a hybrid filter that provides the advantage of having a transmission higher than the transmission of the least transmissive component. Because of this quality, the hybrid filter requires fewer dielectric layers, and it not only functions more effectively than conventional filters but also is easier and less expensive to fabricate. Fabrication of, for example, IR filters in the present invention, having only 8 interference layers, would have a reduced number of processing steps compared to related-art IR filters having at least 16 interference layers for comparable performance.

The diffractive structure and the interference filter together provide a constructive phase interaction which provides a stronger coupling of the light with structure and thus results in a higher transmission. Both technologies are phase dependent, although the diffractive device is a phase difference device and the interference stack is a phase matching device, and thus can interact in destructive and constructive ways.

We claim:
1. A hybrid optical filter comprising:
a nonplanar diffractive grating on a substrate;
an inherently planar interference stack situated on said diffractive grating; and
a planarization layer interposed between said diffractive grating and said interference stack; and wherein:
said substrate is silicon;
said interference stack comprises alternating layers of germanium and zinc selenide; and
said planarization layer is silicon nitride.
2. The hybrid optical filter of the claim 1 wherein:

said grating has a period between 1 and 20 micrometers and a duty cycle between 10 and 90 percent; and said grating has a depth between 0.01 and 10 micrometers.

3. The hybrid optical filter of claim 2 wherein:

said planarization layer has a minimum thickness between said grating and said interference stack, set at a multiple of optical wavelengths; and each of the germanium and zinc selenide layers has an optical thickness between 0.01 and 10.0 micrometers.

4. A method for fabricating a hybrid optical filter comprising:

developing a pattern of a grating having a period between 0.1 and 50 micrometers and a duty cycle between 10 and 90 percent;

impressing through photography the pattern onto a first surface of a substrate;

dry-etching a diffractive grating from the pattern in to the first surface of the substrate;

chemical-vapor depositing a planarization layer onto the diffractive grating;

spin depositing a self-leveling material having a flat surface onto the planarization layer;

dry-etching the self-leveling material down to the planarization layer thereby transferring the flat surface to the planarization layer;

electron-beam depositing a plurality of interference layers on the planarization layer; and depositing an anti-reflecting material on a second surface of the substrate.

5. A method for fabricating a hybrid optical filter comprising:

developing a pattern of a grating having a period between 0.1 and 50 micrometers and a duty cycle between 10 and 90 percent;

impressing through photography the pattern onto a first surface of a substrate;

dry-etching a diffractive grating from the pattern in to the first surface of the substrate;

chemical-vapor depositing a planarization layer onto the diffractive grating;

optical grinding a flat surface on the planarization layer;

electron-beam depositing a plurality of interference layers on the planarization layer; and depositing an anti-reflecting material on a second surface of the substrate.

6. A hybrid optical filter having a pass band, comprising:

a nonplanar diffractive structure on a substrate;

a planarization layer situated on said nonplanar diffractive structure, for maintaining phase coherence of light waves entering into said nonplanar diffractive structure and having a thickness that is a function of a wavelength of the pass band;

an interference stack, situated on said planarization layer, having characteristics such that said diffractive structure, planarization layer and interference stack effect a constructive phase interaction of the light waves such that transmittance of the light waves through said hybrid optical filter is greater than transmittance of the light waves through said diffractive structure, in the pass band.

7. The hybrid optical filter of claim 6 wherein said interference stack comprises alternating layers of a plurality of materials having a plurality of indices of refraction, respectively.

* * * * *